US011788939B2

(12) United States Patent
Althaus et al.

(10) Patent No.: US 11,788,939 B2
(45) Date of Patent: Oct. 17, 2023

(54) METHODS AND SYSTEMS FOR PREPARING DRILL CUTTINGS FOR MEASURING PETROPHYSICAL PROPERTIES OF SUBSURFACE FORMATIONS

(71) Applicant: Saudi Arabian Oil Company, Dhahran (SA)

(72) Inventors: Stacey Althaus, Houston, TX (US); Jin-Hong Chen, Katy, TX (US); Gary Eppler, Baytown, TX (US)

(73) Assignee: Saudi Arabian Oil Company, Dhahran (SA)

( * ) Notice: Subject to any disclaimer, the term of this patent is extended or adjusted under 35 U.S.C. 154(b) by 855 days.

(21) Appl. No.: 16/655,364

(22) Filed: Oct. 17, 2019

(65) Prior Publication Data
US 2021/0116335 A1  Apr. 22, 2021

(51) Int. Cl.
| | | |
|---|---|---|
| *G01N 1/34* | (2006.01) | |
| *E21B 21/06* | (2006.01) | |
| *E21B 49/00* | (2006.01) | |
| *E21B 49/02* | (2006.01) | |
| *E21B 21/01* | (2006.01) | |

(52) U.S. Cl.
CPC .............. *G01N 1/34* (2013.01); *E21B 21/066* (2013.01); *E21B 49/005* (2013.01); *E21B 49/02* (2013.01); *E21B 21/01* (2013.01)

(58) Field of Classification Search
CPC ....... G01N 1/34; E21B 21/066; E21B 49/005; E21B 49/02; E21B 21/01
USPC ........................................................ 210/785
See application file for complete search history.

(56) References Cited

U.S. PATENT DOCUMENTS

| | | | |
|---|---|---|---|
| 2,941,908 | A | 6/1960 | Logan |
| 4,354,513 | A | 10/1982 | Bingham et al. |
| 5,690,811 | A | 11/1997 | Davis et al. |
| 6,079,508 | A | 6/2000 | Caza |

(Continued)

FOREIGN PATENT DOCUMENTS

| | | |
|---|---|---|
| CA | 2941271 A1 | 9/2014 |
| DE | 3213268 A1 | 10/1983 |
| WO | 2018195646 A1 | 11/2018 |

OTHER PUBLICATIONS

International Search Report and Written Opinion for International Application No. PCT/US2020/056096, report dated Feb. 5, 2021; pp. 1-13.

*Primary Examiner* — John Fitzgerald
*Assistant Examiner* — Rodney T Frank
(74) *Attorney, Agent, or Firm* — Bracewell LLP; Constance G. Rhebergen; Keith R. Derrington

(57) ABSTRACT

Methods and systems for separating mud from drill cuttings are disclosed. The method includes collecting drill cuttings from a shale shaker or a wellhead, placing the drill cuttings in a fluid that matches the fluid in the drilling mud, and filtering the drill cuttings through a sieve having a first mesh size. The method further includes placing the filtered drill cuttings in a sieve basket having a second mesh size, wherein the second mesh size is smaller than the first mesh size, placing the sieve basket in a vessel, and adding the fluid to completely submerge the drill cuttings in the fluid. The method also includes placing the vessel including the sieve basket, the drill cuttings, and the fluid in a sonicator-shaker, and simultaneously sonicating and shaking the vessel to separate the drill cuttings from contaminants thereon.

11 Claims, 16 Drawing Sheets

(56) References Cited

U.S. PATENT DOCUMENTS

| | | | |
|---|---|---|---|
| 7,322,431 B2 | 1/2008 | Ratcliff | |
| 8,025,152 B2* | 9/2011 | Vasshus | B07B 1/40 |
| | | | 209/326 |
| 10,151,674 B2 | 12/2018 | Loan et al. | |
| 2003/0107374 A1* | 6/2003 | Chen | G01V 3/32 |
| | | | 324/303 |
| 2005/0205118 A1 | 9/2005 | Zamfes | |
| 2011/0277798 A1 | 11/2011 | Hillier | |
| 2012/0009660 A1* | 1/2012 | Pottathil | C10L 9/00 |
| | | | 435/274 |
| 2013/0269933 A1 | 10/2013 | Pomerantz et al. | |
| 2014/0360538 A1 | 12/2014 | Elliott | |
| 2015/0090292 A1 | 4/2015 | Depatie | |
| 2016/0082494 A1 | 3/2016 | Pomerantz et al. | |
| 2017/0283705 A1 | 10/2017 | Hunter | |
| 2017/0299487 A1* | 10/2017 | Wang | G01N 1/38 |
| 2018/0202906 A1 | 7/2018 | Loan et al. | |
| 2020/0377821 A1* | 12/2020 | Sikora | C11D 11/0041 |

\* cited by examiner

METHODS AND SYSTEMS FOR PREPARING DRILL CUTTINGS FOR MEASURING PETROPHYSICAL PROPERTIES OF SUBSURFACE FORMATIONS

TECHNICAL FIELD

Embodiments relate to systems and methods for preparing drill cuttings for measuring petrophysical properties of subsurface formations.

BACKGROUND

During the drilling of a well, mud is circulated down hole to carry drill cuttings and clean the hole. The drill cuttings are used by geologists to determine the type and characteristics of the drilled strata. In an active mud system, the mud is circulated in a continuous cycle, being pumped from the drill rig mud tanks, down the hole to the drilling bit, and then returning to surface between the drill pipe and the drill hole wall. The mud brings up the drilling cuttings which are sampled, washed, and dried for further analysis and are placed into small plastic vials for both government and oil company use. Various types of drilling mud are used today including oil-based mud. Samples drilled with some types of drilling fluids are harder to clean and due to the constantly increasing rates of penetration of the drilling rigs today, any time saved in the cleaning and processing of samples is a benefit to the geologist or the person washing the samples.

Generally, the samples or drill cuttings are cleansed of debris, oil, mud, and chemicals used in the drilling in order for the cuttings to be analyzed accurately. The standard method of cleaning the drill cuttings comprise manual washing and drying, which can be time consuming and a costly process. In recent years, however, efforts have been made to automate the washing of sample drill cuttings.

Advanced mud logging (AML) allows accurate and inexpensive determination of continuous petrophysical data along a well at any phase of reservoir production using drill cuttings surfaced from downhole. Drill cuttings are broken pieces of solid rocks produced by the drill bit advancing through the formation. However, when drill cuttings are collected from the well they are in a mixture with drilling mud and cavings. The mud contains contaminates, such as barite and clays, that must be removed from the drill cutting sample for accurate quantitative analysis to be conducted. Solid contaminants can tightly adhere to the surface of drill cuttings and can be difficult to remove. Cavings are larger pieces of rock from other depths of the well that are not generated by the drill bit. They must also be separated from the cuttings so that the measured data provides a credible mud log.

SUMMARY

In addition, in order to do NMR measurements the sample needs to be completely saturated with fluid. The disclosed methods and systems separate and remove both drilling mud and cavings from drill cuttings, and simultaneously saturate the drill cuttings so they can be further used for analysis.

Accordingly, one embodiment is a method for cleaning drill cuttings. The method includes collecting drill cuttings from a shale shaker or a wellhead, placing the drill cuttings in a fluid that matches the fluid in the drilling mud, and filtering the drill cuttings through a sieve having a first mesh size. The method further includes placing the filtered drill cuttings in a sieve basket having a second mesh size, wherein the second mesh size is smaller than the first mesh size, placing the sieve basket in a vessel, and adding the fluid to completely submerge the drill cuttings in the fluid. The method also includes placing the vessel including the sieve basket, the drill cuttings, and the fluid in a sonicator-shaker, and simultaneously sonicating and shaking the vessel to separate the drill cuttings from contaminants thereon. The method further includes filtering the drill cuttings through the sieve basket, adding new fluid to the vessel, and repeating sonicating and shaking the vessel to separate the drill cuttings from contaminants thereon, thereby cleaning the drill cuttings and completely saturating the drill cuttings with the fluid.

Another embodiment is a system for cleaning drill cuttings. The system includes a sonicator-shaker including an ultrasonic bath and a shaker configured to receive one or more vessels, a cylindrical vessel configured to contain a sieve basket and a fluid, and a sieve basket configured to receive the drill cuttings. The sieve basket may include a substantially cylindrical mesh structure having a length, a top, and a bottom, wherein the mesh structure is continuous, and a substantially circular mesh base covering the bottom of the cylindrical mesh structure. The substantially circular mesh base may be offset from the bottom of the cylindrical mesh structure. The mesh structure and the mesh base have a mesh size of about 0.5 mm. The sonicator-shaker may be configured to simultaneously sonicate and shake the vessel to separate the drill cuttings from contaminants thereon.

Another embodiment is an apparatus for cleaning drill cuttings. The apparatus may include a substantially cylindrical mesh structure having a length, a top, and a bottom, wherein the mesh structure is continuous, and a substantially circular mesh base covering the bottom of the cylindrical mesh structure. The substantially circular mesh base may be offset from the bottom of the cylindrical mesh structure. The mesh structure and the mesh base have a mesh size of about 0.5 mm.

DETAILED DESCRIPTION

The particulars shown here are by way of example and for purposes of illustrative discussion of the examples of the subject disclosure only, and are presented in the cause of providing what is believed to be the most useful and readily understood description of the principles and conceptual aspects of the subject disclosure. In this regard, no attempt is made to show more detail than is necessary, the description taken with the drawings making apparent to those skilled in the art how the several forms of the subject disclosure may be embodied in practice. Furthermore, like reference numbers and designations in the various drawings indicate like elements.

The present disclosure relates to methods and apparatuses for efficiently removing contaminants and cavings from drill cuttings and to completely saturate the drill cuttings for advanced mud logging. The method includes using ultrasound waves and mechanical shaking to separate solid mud particles adhered to the surface of drill cuttings. In one embodiment, the method includes, in Step I, collecting surfaced drill cutting samples from a shale shaker or a wellhead. Step II involves separating cavings from the drill cuttings. In this step, the collected drill cutting samples are placed in a fluid that matches the fluid in the drilling mud. For example, brine is used if water-based-mud was used in drilling, and diesel is used when oil-based-mud was used in drilling. The fluid also dilutes the sample and allows the sample to filter through a sieve with a certain size, for example a 3 mm sieve. The particles larger than this size are then collected and categorized as cavings.

Figure 1:
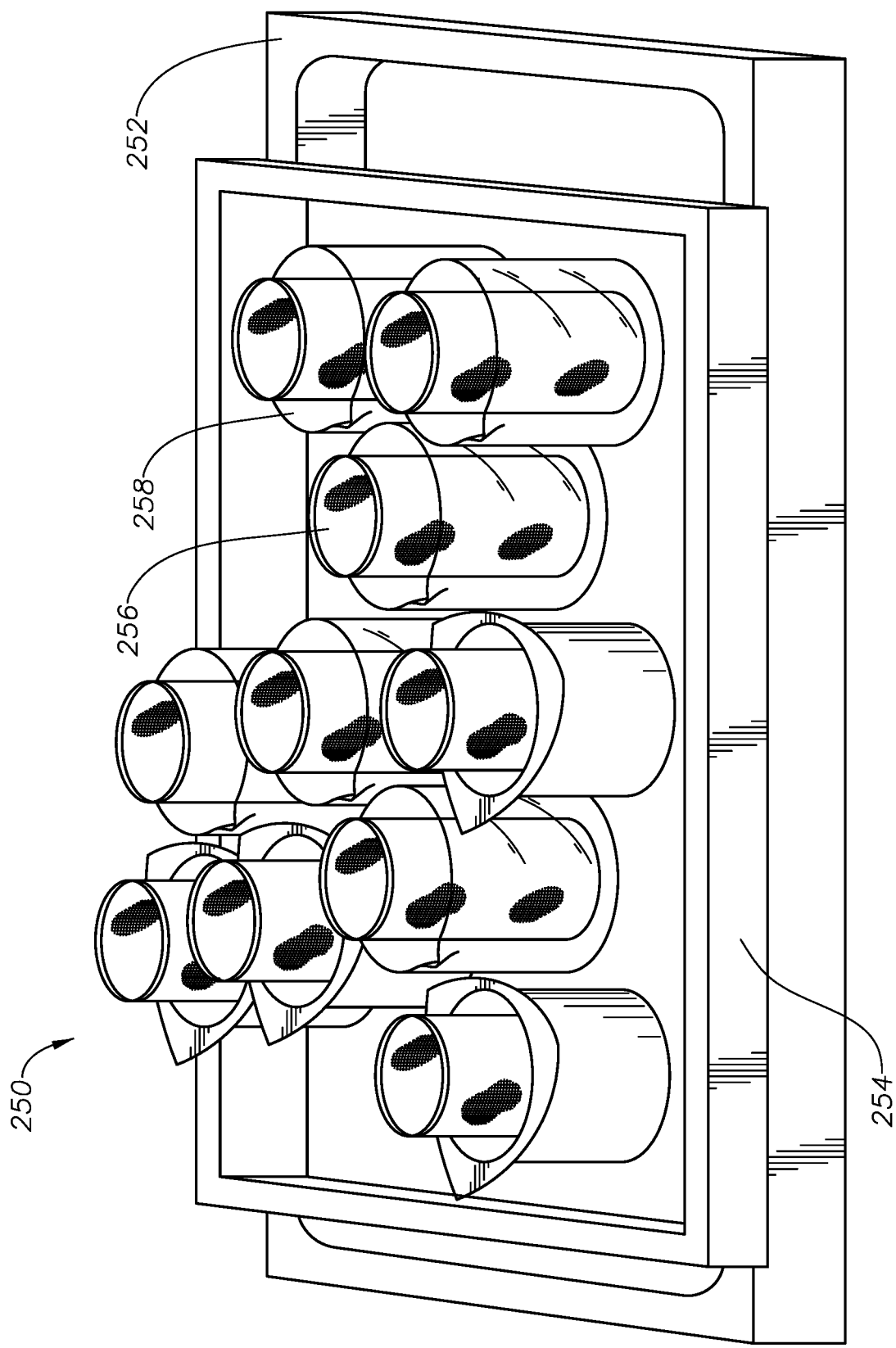
FIG. 1 illustrates a system for preparing drill cuttings for performing petrophysical measurements, according to one embodiment of the disclosure.

The next step, Step III, is to separate contaminants from the drill cuttings and to saturate the drill cuttings. FIG. 1 illustrates a system 250 for preparing drill cuttings for performing petrophysical measurements, according to one embodiment. The system 250 includes a sonicator-shaker including an ultrasonic bath or sonicator 252, and a mechanical means 254, such as a vibrator or a motor to induce vibrations or shake the samples inside the sonicator 252 at a predetermined frequency.

The ultrasonic bath may include a heater (20-80° C.) that can be thermostatically adjustable with an LED-display showing target value and actual value of temperature. The ultrasonic bath may include transducers with high accuracy (for example >0.1% accuracy). The ultrasonic bath 252 can have an area of, for example, about 500 mm×300 mm, and a depth of about 65 mm. One example of a sonicator is Sonorex Digitec®, an ultrasonic bath produced by Bandelin Electronic GmbH & Co.

The samples of drill cuttings obtained from Step II are placed in multiple sieve-baskets 256 that are individually placed in glass or plastic vessels 258. Using separate vessels 258 may prevent cross contamination between different samples. The vessels 258 with the sieve-baskets 256 are placed in the sonicator-shaker. The samples can be sonicated either for a selected time or in a continuous mode. The shaker can have multiple different shaking frequencies, which enable a gentle to vigorous reciprocating motion of up to a maximum amplitude of 20 mm. The sonication time can be from about 1-15 min. The sonicator-shaker can accommodate mounting of 36×10-ml-vessels or 36×25-ml-vessels or 18×50-ml-vessels or 12×100-ml-vessels or 10×250-ml-vessels. Additionally, fresh clean fluid may be circulated using one or more fluid loops (not shown) for each vessel 258.

Sieve-baskets 256 can have a predetermined mesh size, for example 0.5 mm. The same fluid used in Step II is then added to the vessels 258 to completely submerge the samples. The vessels 256 containing the saturating fluid and the drill cuttings are then placed in the sonicator-shaker 250. The sample is sonicated to assist in separating the mud contaminants from the surface of the drill cuttings and to saturate the drill cutting with the fluid. The shaking assists the sieving process. The sieve-basket 256 is removed and then placed in a fresh vessel of fluid after a specified time. Alternatively, the fluid can be circulated through the vessel through a fluid loop or multiple loops. The step of sonication combined with mechanical shaking is performed multiple times until the contaminants are completely removed or the fluid no longer turns cloudy. The cleaned and saturated drill cuttings are what remains in the sieve-basket and can now be used for further analysis.

Figure 2:
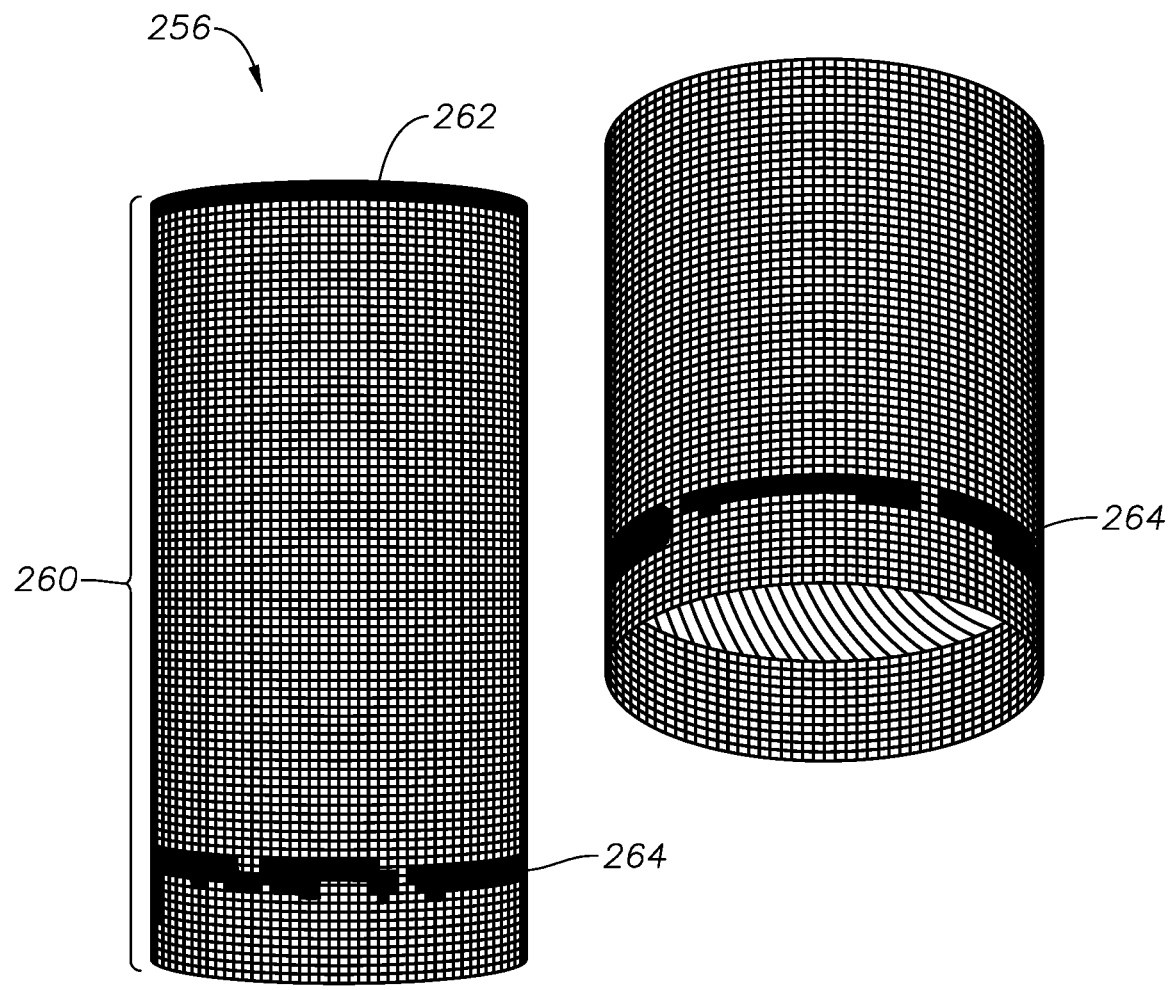
FIG. 2 illustrates an apparatus for preparing drill cuttings for performing petrophysical measurements, according to one embodiment of the disclosure.

FIG. 2 illustrates an apparatus or sieve-basket 256 for preparing drill cuttings for performing petrophysical measurements, according to one embodiment. The sieve-basket 256 has a substantially cylindrical structure with a length 260, top 262, and a bottom base 264 that is slightly offset from the bottom of the cylindrical structure. The entire sieve-basket 256, including the bottom base 264, is a mesh structure made of either steel, aluminum, or plastic, thereby allowing for the fluid to flow all around and particles smaller than the mesh size to flow out. The mesh structure can have a mesh size of about 0.5 mm, for example.

Figure 3:
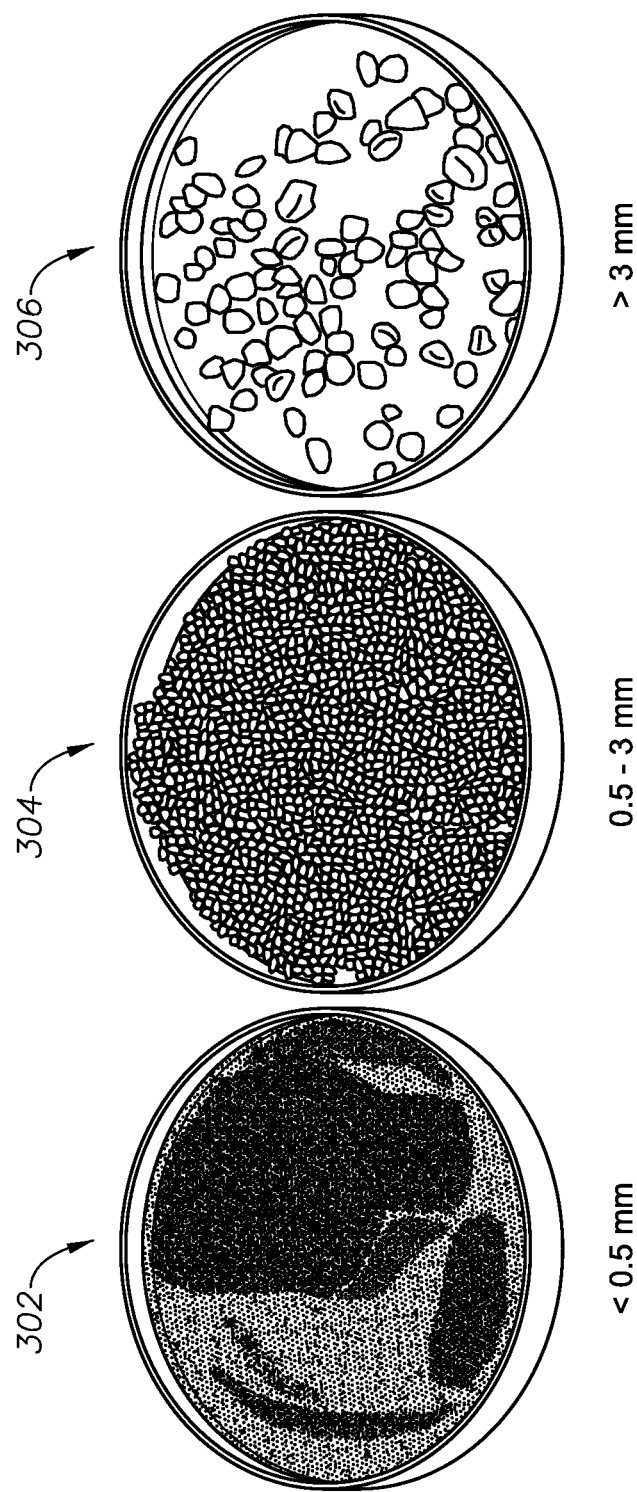
FIG. 3 shows particles obtained from each step in the cleaning process, according to one embodiment of the disclosure.

FIG. 3 shows particles obtained from each step in the cleaning process, according to one embodiment. The received samples are separated, for example, into three size categories: contaminants 302 (particles, for example, smaller than 0.5 mm), saturated drill cuttings 304 (drill cuttings, for example, between 0.5 mm and 3 mm), and cavings 306 (cavings, for example, larger than 3 mm). Although some example of sizes are provided, it should be noted, however, that the size can vary depending on the subsurface formation.

Figure 4:
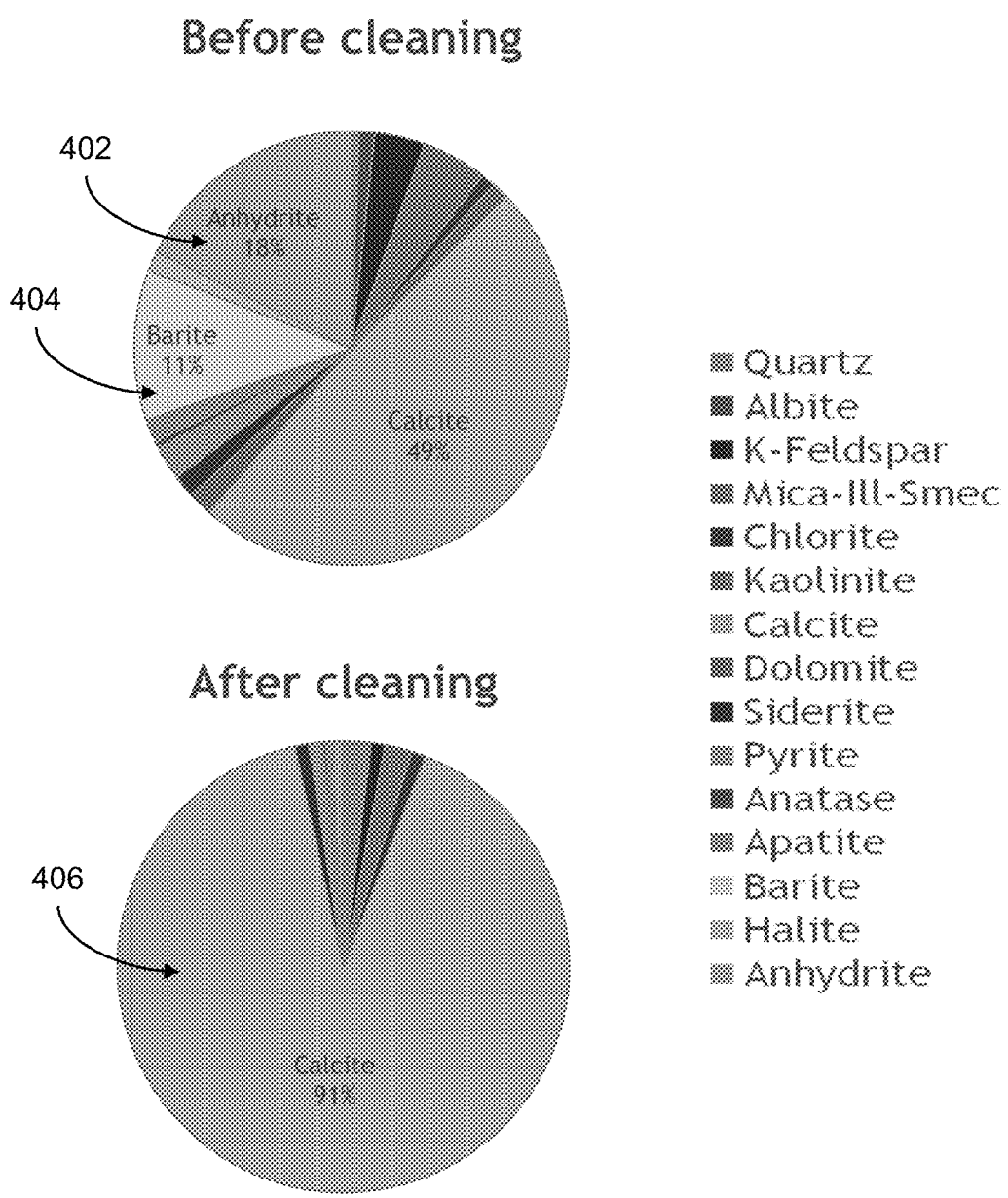
FIG. 4 shows example compositions of the subsurface formation, before and after cleaning, according to one embodiment of the disclosure.

FIG. 4 shows example compositions of the subsurface formation, before and after cleaning, according to one embodiment. The results suggest that the disclosed methods and systems are successful in significantly reducing contaminants such as anhydrite 402 and barite 404 from the drill cutting samples. Anhydrite 402 and barite 404 are drilling mud additives that are commonly found on drill cuttings, and they are effectively removed through the disclosed cleaning procedure. Similarly, the amount of calcite 406 is significantly increased from about 49% before cleaning to about 91% after cleaning.

Figure 5:
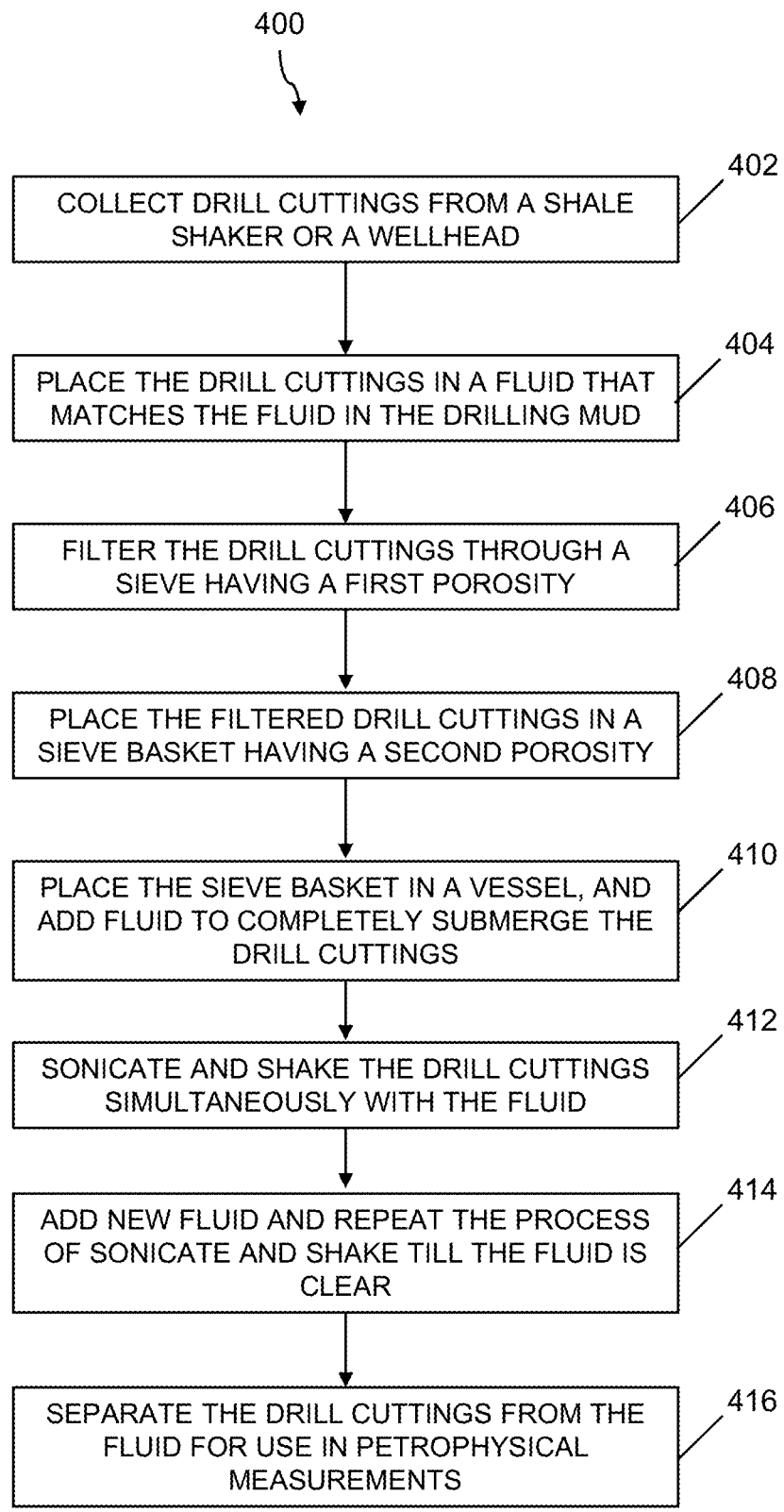
FIG. 5 illustrates example steps in a method for preparing drill cuttings for performing petrophysical measurements, according to one embodiment of the disclosure.

FIG. 5 illustrates example steps in a method 400 for preparing drill cuttings for performing petrophysical measurements, according to one embodiment. The method includes, in step 402, collecting surfaced drill cutting samples from a shale shaker or a wellhead. Step 404 involves separating cavings from the drill cuttings. In this step, the collected drill cutting samples are placed in a fluid that matches the fluid in the drilling mud. For example, brine is used if water-based-mud was used in drilling, and diesel is used when oil-based-mud was used in drilling. Step 406 involves filtering the drill cuttings through a sieve with a certain mesh size, for example a 3 mm sieve. The particles larger than this size are then collected and categorized as cavings. The next step, step 408, is to separate contaminants from the drill cuttings and to saturate the drill cuttings. In this step, the samples of drill cuttings obtained from step 404 are placed in multiple sieve-baskets (for example, 0.5 mm mesh sieve-baskets) that are individually placed in glass or plastic vessels. At step 410, new fluid is added to completely submerge the drill cuttings in the fluid. At step 412, the vessels 258 with the sieve-baskets 256 are placed in the sonicator-shaker. This device sonicates and shakes the sample simultaneously to clean and size-sort the sample, at step 412. In step 414, the mud and diesel filtered through the sieve are replaced periodically with fresh diesel. Sonication and shaking continues until the diesel is no longer muddy or cloudy. In step 416, the sample can then be measured, for example, via NMR to obtain accurate petrophysical data. The cleaned drill cuttings can be also be dried for other measurements such as mineralogy and composition analysis.

The disclosed methods and systems have the following advantages over prior art methodologies: They can be easily adapted and used at wellsite. They can be easily scaled up to process large number of samples by running multiple systems simultaneously. Ultrasonic baths and mechanic shaking can be used simultaneously to efficiently separate contaminants from drill mud adhered to the surface of drill cuttings. The method completely saturates the drill cuttings with the drilling fluid, thereby preparing the drill cuttings for direct measurement of petrophysical data. The use of multiple sieve baskets in one sonicator can increase cleaning efficiency rapidly.

Example embodiments disclosed propose a method to measure and analyze drill cuttings using a combination of nuclear magnetic resonance (NMR) measurements and mass measurements in-air and in-fluid to obtain multiple key petrophysical parameters accurately with little sample preparation. Example embodiments present a new and accurate method to measure the bulk density using saturated drill cuttings, which are readily available for any drilled hydrocarbon well. The method combines NMR and gravimetric techniques, and the results include bulk density, grain density, porosity, and pore-size distribution of the drill cuttings.

Figure 6:
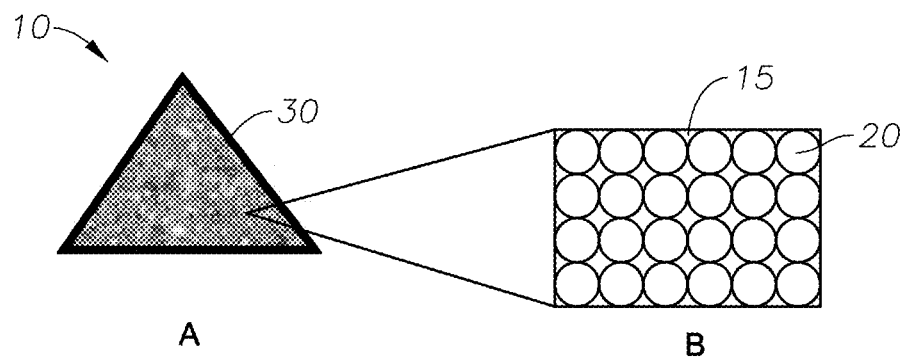
FIG. 6 illustrates an example sample or drill cutting of a subsurface formation, according to one example embodiment of the disclosure.

Turning now to the figures, FIG. 6 illustrates a sample 10, such as a drill cutting of a subsurface formation, such as from a hydrocarbon reservoir. In an exemplary method, the first step is to collect drill cuttings 10 that are representative of the subsurface formation. The next step is to size-sort as to eliminate particles of large size, which are normally from caving, and to eliminate particles of too small a size, which may have circulated multiple times through the up-hole and down-hole cycles with the drilling mud. In some embodiments, at least one dimension of the fluid-saturated sample may be about 0.5 mm to 3 mm. These limits, however, can be adjusted according to the specific formation and the bits used for drilling.

Additionally, the collected cuttings may be washed using sufficient fluid such that it minimizes the impact of small particles from drilling mud that stick to the cutting surface or in the surrounding fluid which can impact both mass measurements and NMR measurements. Washing may also benefit other subsequent measurements, such as gamma-ray measurement, on the drill cuttings because the effect of the small particles on the gamma ray measurements can be significant.

The figure on the left in FIG. 6, denoted A, illustrates a drill cuttings chip 10 with fluid 30 on the surface, with a volume of $V_{sur}$. The volume of the cutting inside the fluid envelope can be given as $V_c$. The figure on the right in FIG. 6, denoted B, is a magnified portion of the interior of the cutting chip 10 consisting of matrix grains 20 (may be in spheres or other geometric shapes) with volume of $V_m$ and density of $\rho_m$, and pore space 15, with volume of $V_\phi$ and filled by a fluid with a density of $\rho_l$.

Figure 7:
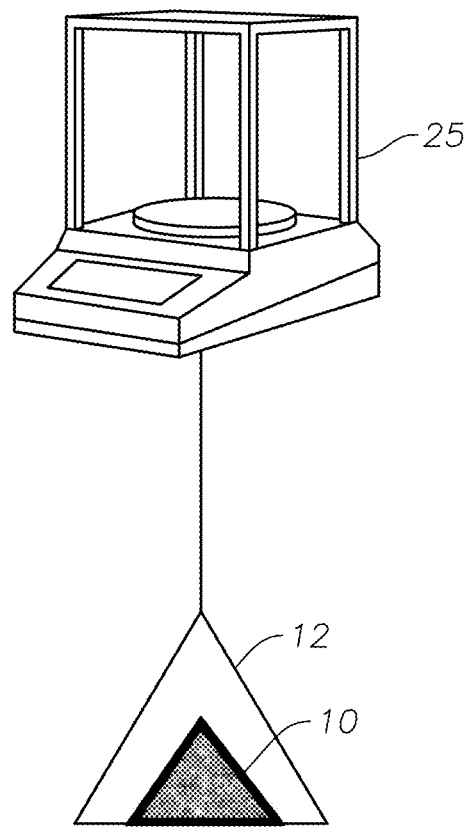
FIG. 7 illustrates an example apparatus for determining in-air mass of a fluid-saturated sample of a subsurface formation, according to one example embodiment of the disclosure.

The next step of the method is to measure the in-air mass of the collected drill cutting 10. FIG. 7, for example, illustrates an apparatus, such as a weighing balance 25 with a support device 12 that may be used to measure the in-air mass of the cutting sample 10. The in-air mass includes mass of the sample, mass of a fluid surrounding the sample, and mass of the fluid inside the sample. The in-air mass of the fluid-saturated sample, $m_s$, may be given by the formula $$m_s = V_m \rho_m + (V_\phi + V_{sur})\rho_l$$

where $\rho_m$ is a density of the matrix of the subsurface formation, $\rho_l$ is a density of the fluid inside and surrounding the sample, $V_m$ is a volume of the matrix, $V_\phi$ is a volume of the fluid inside the sample, and $V_{sur}$ is a volume of the fluid surrounding the sample.

The next step is to separately determine volume of the fluid inside the sample, $V_\phi$, and volume of the fluid surrounding the sample, $V_{sur}$, using nuclear magnetic resonance (NMR). To clearly separate the NMR signals for liquid inside and surrounding the cuttings, a sufficient amount of surrounding fluid may be used one time or in a step-wise fashion. Due to the clay sensitivity issues, many wells in unconventional plays are drilled using oil based mud (OBM). The example embodiments disclosed propose a new method to separate the NMR signal of the fluid on the cuttings surfaces and the fluids from the interior pores of the cutting samples based on two assumptions: (1) fluids inside the shale cuttings have short relaxation time, and (2) fluid from OBM has a longer $T_2$, even in the presence of cuttings.

Figure 8:
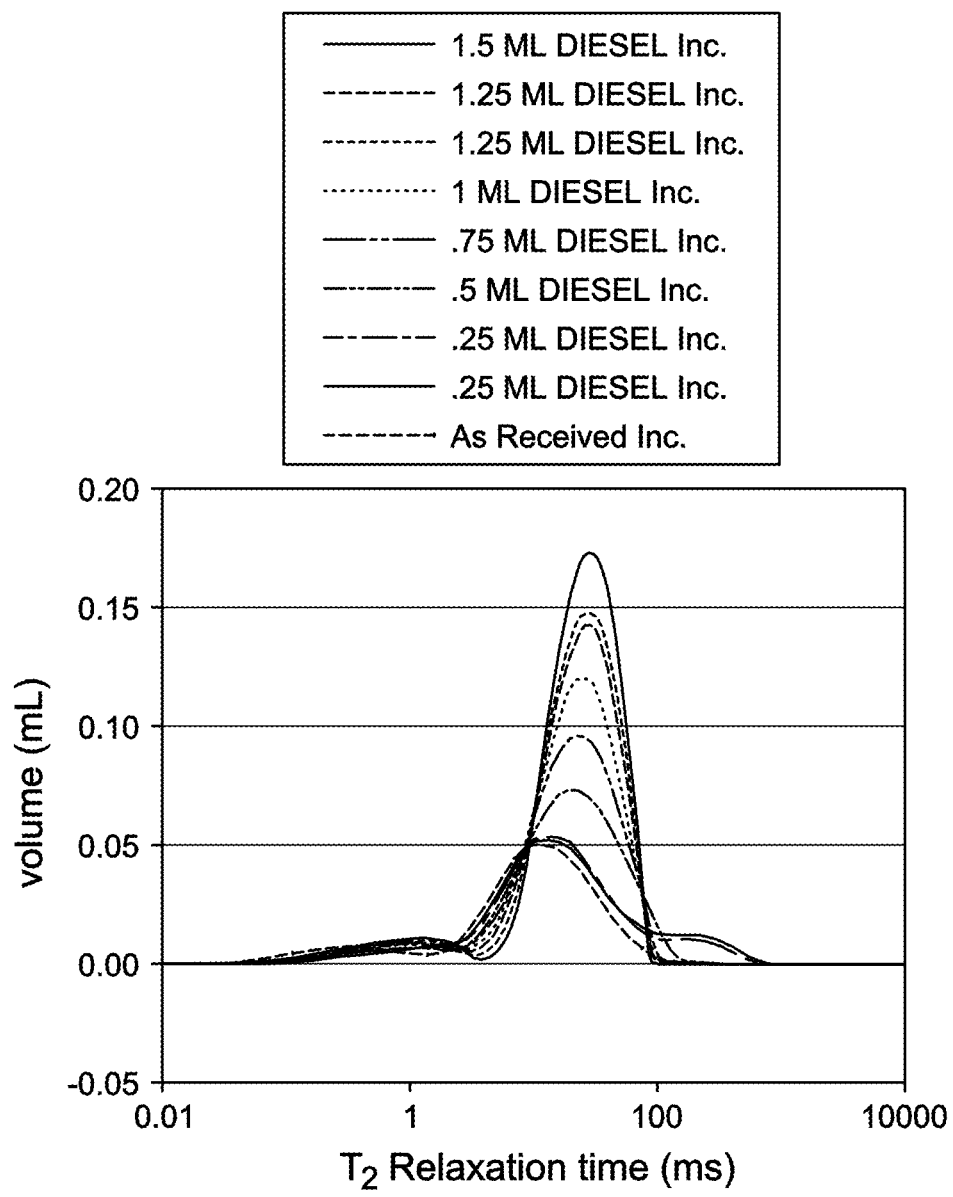
FIG. 8 illustrates example NMR spectra of a sample from a subsurface formation with varying amounts of washing fluid added, according to one example embodiment of the disclosure.

FIG. 8 illustrates an example graph 35 showing NMR readings (spectra) a sample of a subsurface formation with varying fluid content added to the sample, according to one example embodiment of the disclosure. A series of NMR experiments may be performed on the cutting sample and a $T_2$ incremental distribution spectra may be obtained as shown in FIG. 8, for example. A known amount of the drilling fluid, diesel for example, can be gradually added to the cutting sample and measurement may be made, for example, "1.5 ML DIESEL Inc." stands for the incremental $T_2$ distribution curve after 1.5 ml diesel was added to the original cutting sample. Two modes of $T_2$ distribution may be noted, for example, a bigger one around 25 ms representing the free fluid, and a smaller peak below 1 ms representing the fluid inside the cutting samples.

A series of NMR experiments with cuttings demonstrate that the mode position of the $T_2$ signal of the OBM outside the cuttings does move to longer relaxation times as more fluid is gradually added (FIG. 8), and stops moving when the volume of added fluid is relatively large compared to the original amount of fluid on the surface. It should also be noted separation and quantification of the liquid inside the cuttings when a large amount of drilling fluid is present is attainable as there are two modes of $T_2$ distribution (FIG. 8). A larger peak around 25 ms representing the free fluid outside the cuttings, and a smaller peak below 1 ms representing the fluid inside the cutting samples. On the top curve (1.5 ml diesel inc., where the word 'inc.' stands for incremental $T_2$ distribution), the two modes are more clearly separated than the bottom curve (as received, with no extra diesel added).

Figure 9:
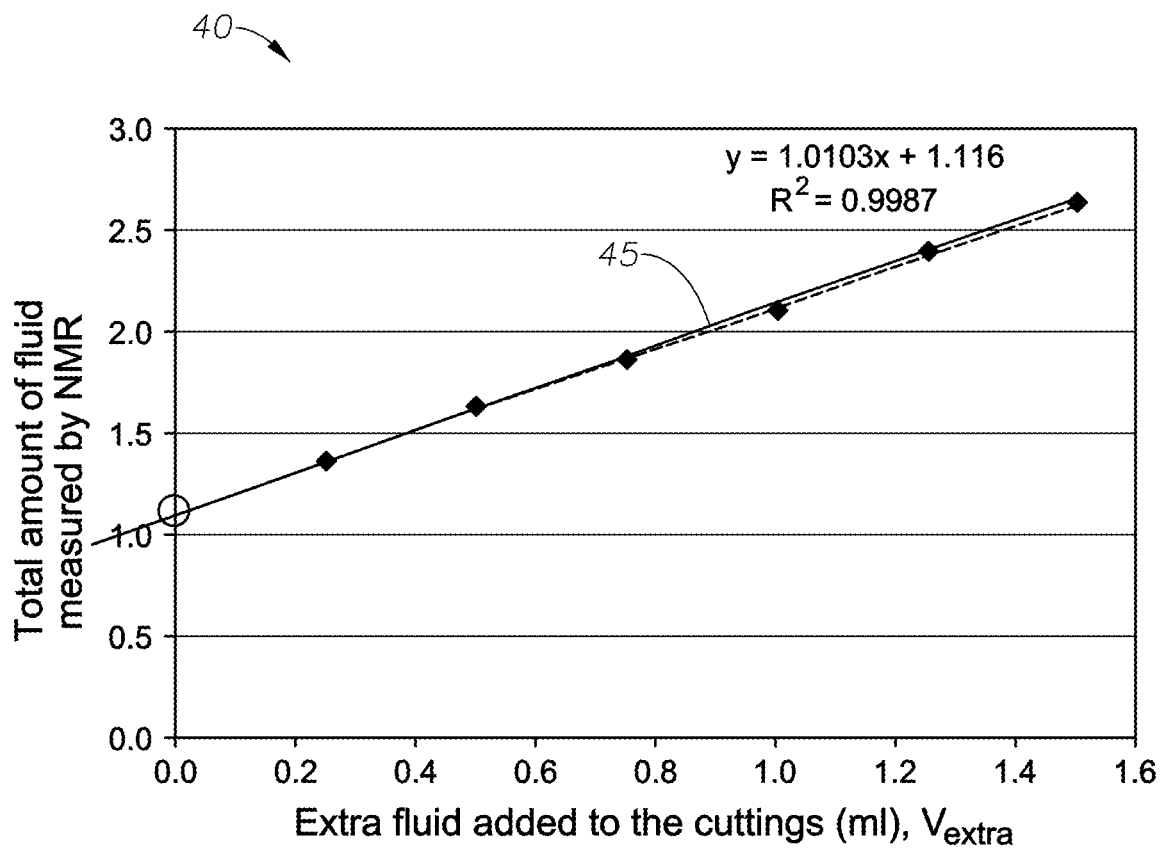
FIG. 9 illustrates an example graph showing NMR results of a sample of a subsurface formation, according to some example embodiments of the disclosure.
Figure 10:
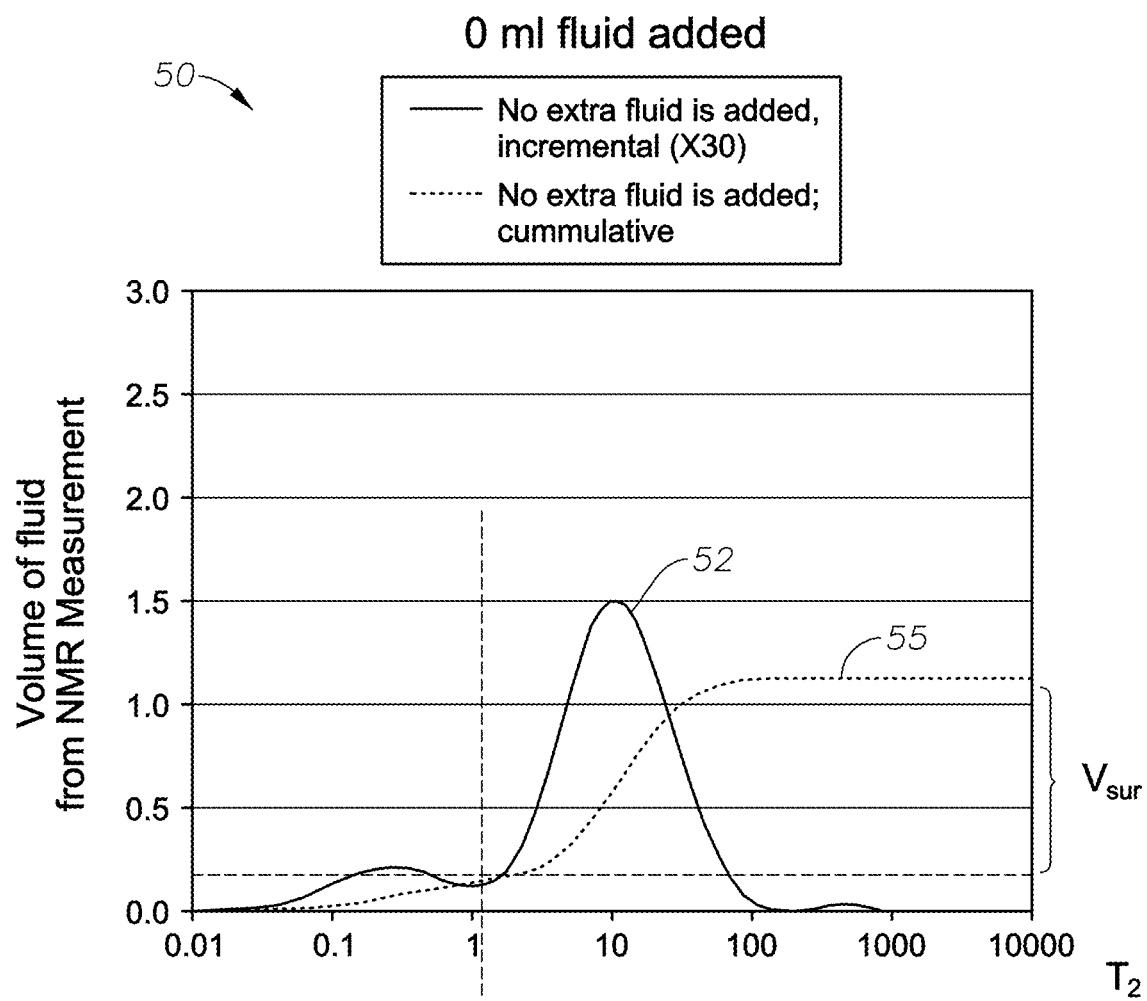
FIG. 10 illustrates example NMR spectra (one spectrum in incremental and the other in cumulative) of a sample from a subsurface formation without any extra fluid added, according to one example embodiment of the disclosure.

FIG. 9 illustrates an example graph 40 of the total amount of fluid measured by NMR (vertical axis) versus the extra fluid added to the cutting sample in ml (horizontal axis). It can be seen from the graph that line 45 intercepts with the vertical axis just above 1, and this is the total amount of fluid on the surface of and inside the cutting sample prior to the addition of diesel. FIG. 10 shows a graph 50 with no extra fluid added; a single point method of separation of $V_{sur}$ and $V_\Phi$. Here it can be seen that the cumulative volume 52 of $T_2$ distribution of fluid from NMR measurement (scale on the right) and the incremental volume 53 of fluid (scale on the left) from NMR measurement are plotted.

No additional fluid is added in this variation of the method. A cut off 51 is selected from the incremental $T_2$ distribution line (a vertical dotted line drawn at the trough on the incremental curve in FIG. 10, the volume to the left of which represents the fluid volume inside the cuttings and to the right of which represents the volume on the surface, or bulk volume movable (BVM) when more fluid is added). The total volume of the fluid inside the cuttings (54, dashed line) can be read from the cumulative curve 52 and the volume on the surface of the cuttings is the difference between the total and the volume inside the cuttings ($V_{sur}$ in FIG. 10, or BVM on experiments when known amount of extra fluid is added)

Figure 11:
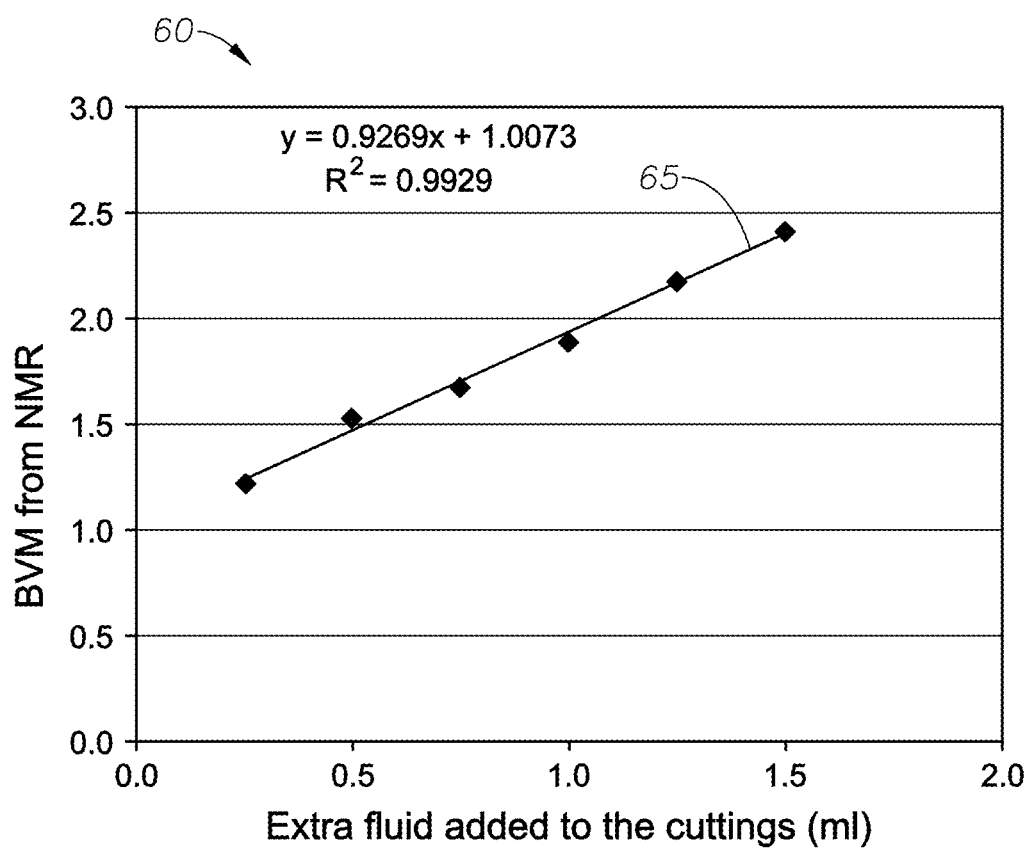
FIG. 11 illustrates an example graph showing NMR results of a sample of a subsurface formation, according to one example embodiment of the disclosure.

In case where excess fluid is present a plot can be graphed as seen in FIG. 11. Similar to line 45 shown in FIG. 9, line 65 in graph 60 shown in FIG. 11 illustrates that the BVM volume measurement from NMR increases as extra fluid is added to the cutting sample. Graph 60 shows a multi-point measurement from BVM to separate $V_{sur}$ and $V_\Phi$, which is BVM versus amounts of fluid added to the cutting sample. The intercept of the regression line 65 shows the volume of fluid on the surface of the cuttings ($V_{sur}$ is the intercept of the regression line, which is 1.0073 ml for this example).

Figure 12:
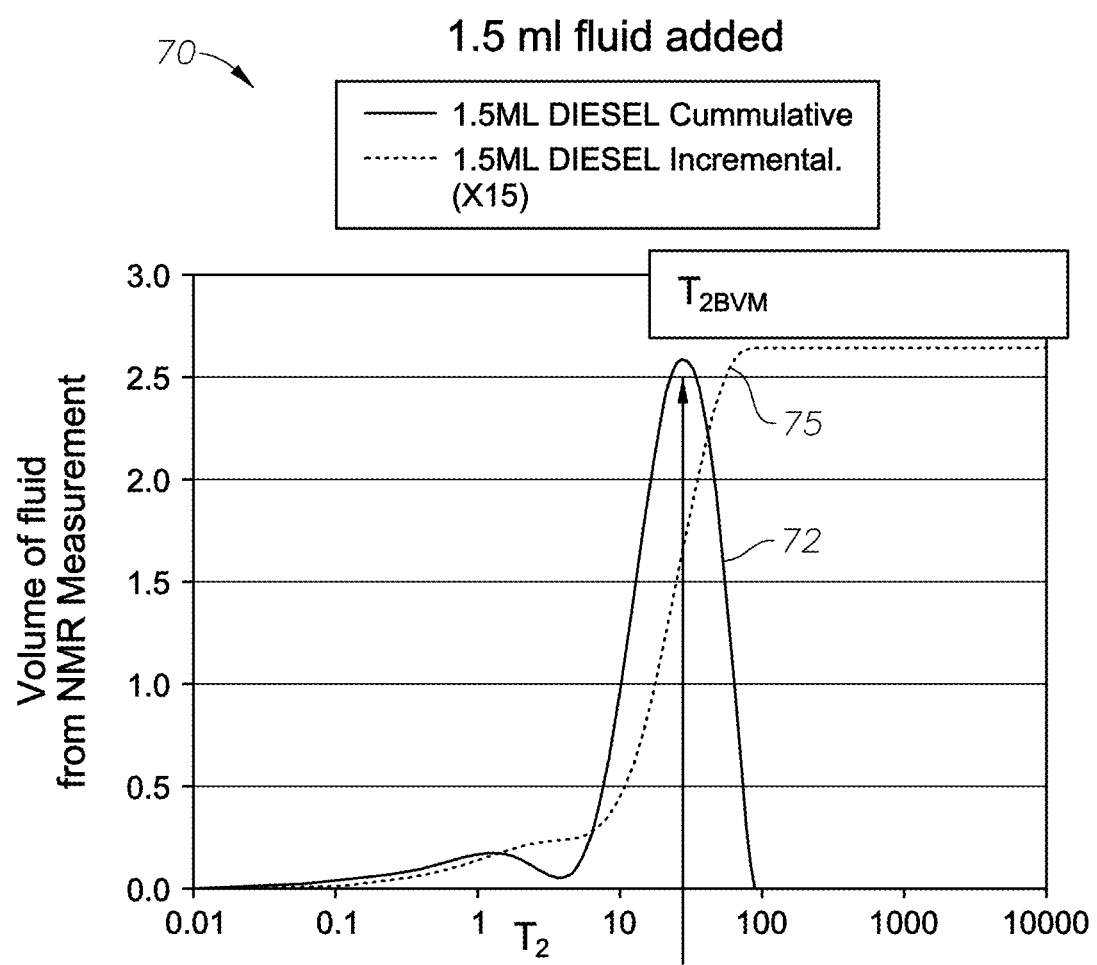
FIG. 12 illustrates an example of NMR results from a sample of a subsurface formation with extra fluid added (1.5 ml for this example), according to one example embodiment of the disclosure.
Figure 13:
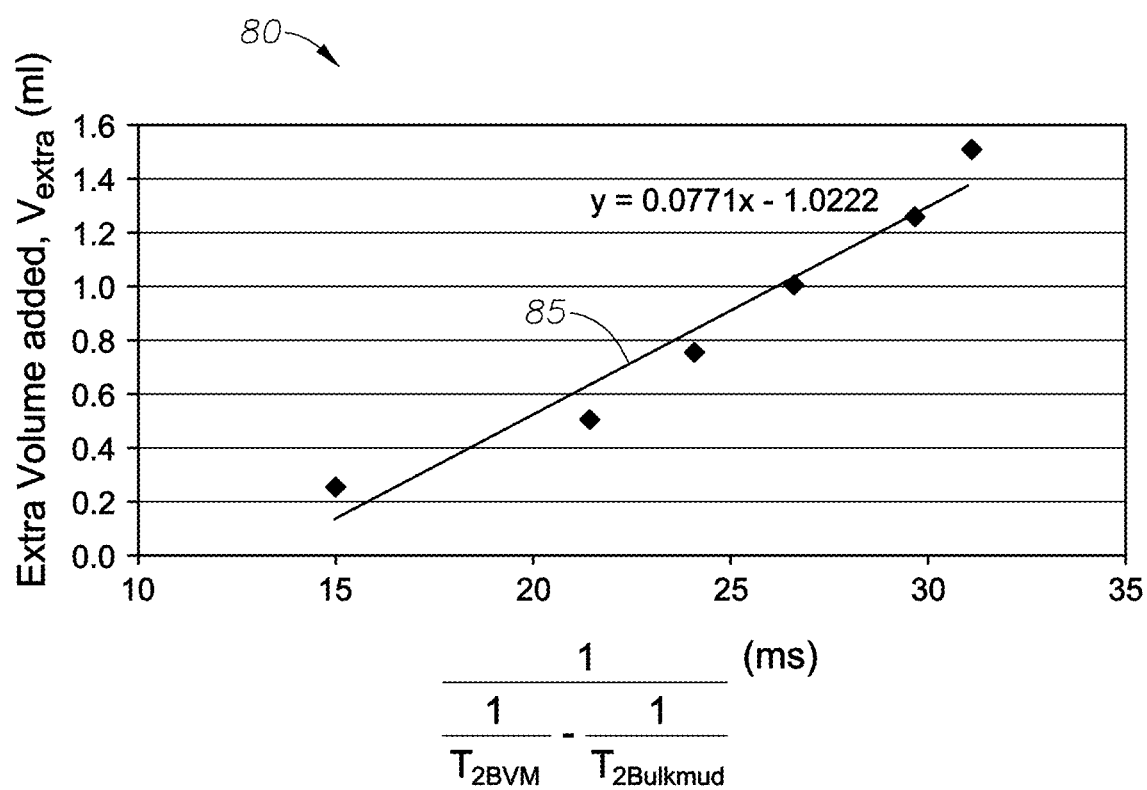
FIG. 13 illustrates an example graph showing NMR results from a sample of a subsurface formation, according to one example embodiment of the disclosure.

FIG. 12 illustrates another example graph 70 where 1.5 ml of fluid is added to the sample. Again both cumulative volume 75 of $T_2$ distribution (scale on the right) of fluid from NMR measurement and the incremental volume 72 (scale on the left) of $T_2$ distribution of fluid from NMR measurement are plotted. From the incremental volume 72 (scale on the left) of $T_2$ distribution curve, the mean of the bulk volume movable can be found, labeled as "$T_{2BVM}$". When various amounts of fluid are added to the sample, a series of "$T_{2BVM}$" values can be acquired in a method outlined here or other methods similar to the method outlined here, and the use of "$T_{2BVM}$" is shown in FIG. 13. Graph 80 shown in FIG. 13 illustrates a third way to get the amount of the fluid on the surface of cuttings, $V_{sur}$, using the $T_{2BVM}$ value. The negative of the intercept of the regression line 85 is the volume of fluid on the surface of the samples ($V_{sur}$ is the negative intercept of the regression line, which is 1.00222 ml for this example, where $T_{2bulkmud}$ is the $T_2$ relaxation time of the fluid (maybe the drilling fluid or others) to rinse the sample with.

Figure 14:
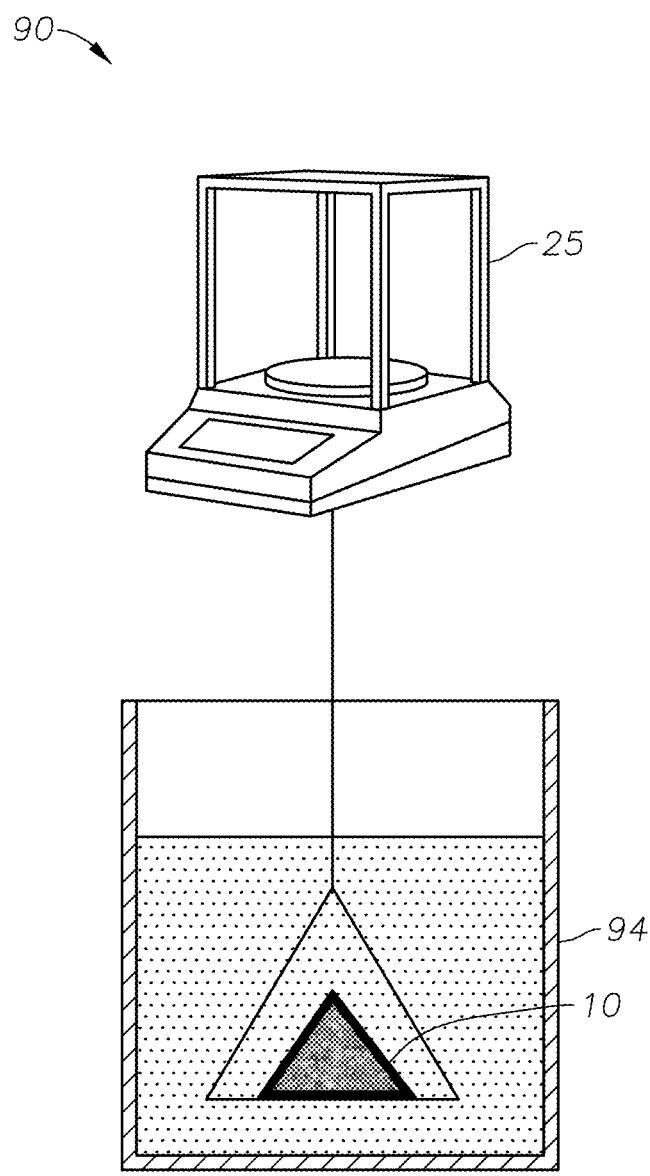
FIG. 14 illustrates an example apparatus for determining in-fluid mass of a fluid-saturated sample of a subsurface formation, according to some example embodiments of the disclosure.

The next step is to measure the sample mass in a weighing fluid. FIG. 14 illustrates an experimental set up 90 including an apparatus 25 for measuring the in-fluid mass of the sample, according to one example embodiment. In this example, the fluid-saturated sample 10 may be placed in a weighing fluid 94, and the weighing scale 25 may be used to measure the in-fluid mass of the sample 10. The weighing fluid can be the drilling fluid, or a fluid with gravimetric properties similar to the drilling fluid. In one example embodiment, the weighing fluid is diesel.

The mass of the sample in the weighing fluid, $m_f$, may be given by the formula $$m_f = V_m \rho_m + V_\phi \rho_l - V_c \rho_f$$

where $\rho_f$ is the density of the weighing fluid. From the combination of two mass measurements and NMR measurement, multiple key parameters can be obtained as outlined in the following sections for reservoir characterization. These parameters include porosity, cutting total volume, bulk density, and matrix/grain density. For example, the method may further include determining a volume of the sample, $V_c$, using the formula $$V_c = (m_s - m_f - V_{sur}\rho_l)/\rho_f$$

In the next step, the method may also include determining a bulk density of the sample, $\rho_b$, using the formula $$\rho_b = \frac{V_m \rho_m + V_\phi \rho_l}{m_s - m_f - V_{sur}\rho_f} \rho_f.$$

In the next step, the method may further include determining the volume of the matrix, $V_m$, using the formula $$V_m = (m_s - m_f - V_{sur}\rho_f)/\rho_f - V_\phi.$$

As a last step, the method may include determining the matrix or grain density of the subsurface formation, $\rho_m$, using the formula $$\rho_m = \frac{m_s - (V_\phi + V_{sur})\rho_f}{(m_s - m_f - V_{sur}\rho_f)/\rho_f - V_\phi}.$$

These measurements can be performed on the cutting samples along the entirety of the drilled well and, thus, data can be obtained to evaluate the heterogeneity of the vertical or horizontal wells. This could potentially be used in real time to optimize the number and placement of fracturing stages for unconventional reservoirs.

Here, the contribution of the sample support device (12 in FIG. 6) is neglected, as the sample support device is chosen so the volume is minimum compared to the volume of the cuttings. There are three types of fluids involved in the drill cuttings analysis: the fluid inside the cutting samples, the drilling fluid, and the weighing fluid. At well site, depending on the permeability of the rock, the fluid inside can be replaced by the drilling fluid to various degrees. For example, for cuttings of unconventional rocks, it is likely that the fluid on the surface of the cuttings is different from the fluid inside, whereas for cuttings of very permeable rocks, the original fluid inside the cuttings is replaced by the drilling fluid rather quickly. If we choose the drilling fluid as the weighing liquid, the most complicated situation involves two types of fluids: the original fluid inside the pores and the drilling fluid. In the case where all three fluids are the same for high permeable rocks, the following calculations may be simplified even further. The following calculation uses two types of fluids as an example.

Figure 15:
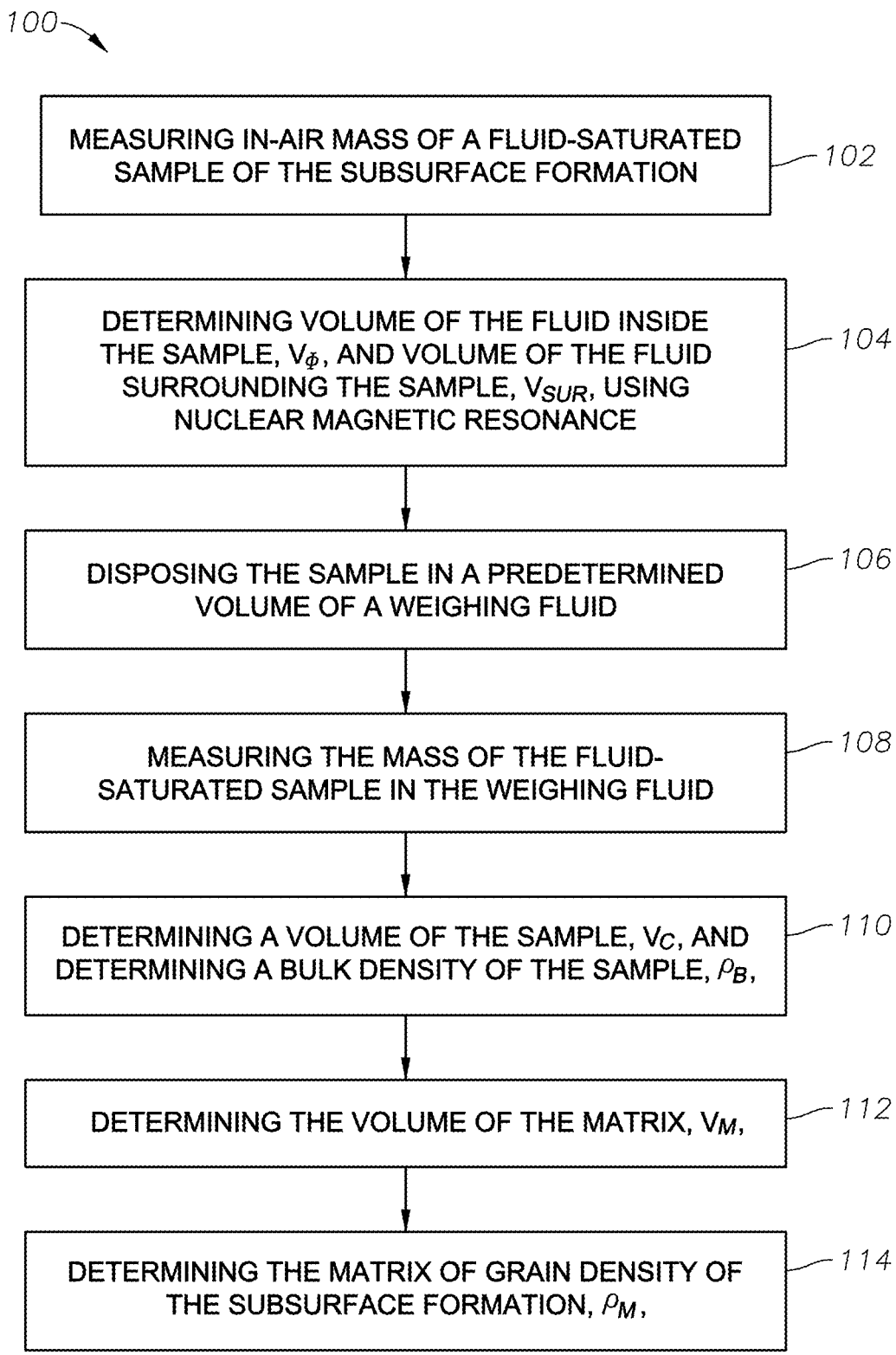
FIG. 15 illustrates example steps in a method for determining matrix or grain density of a subsurface formation, according to some example embodiments of the disclosure.

FIG. 15 illustrates an example method 100 for determining matrix or grain density of a subsurface formation. The method includes measuring in-air mass of a fluid-saturated sample of the subsurface formation in step 102. The in-air mass includes mass of the sample, mass of a fluid surrounding the sample, and mass of the fluid inside the sample. The in-air mass of the fluid-saturated sample, $m_s$, may be given by the formula $$m_s = V_m \rho_m + (V_\phi + V_{sur}) \rho_l$$

where $\rho_m$ is a density of the matrix of the subsurface formation, $\rho_l$ is a density of the fluid inside and surrounding the sample, $V_m$ is a volume of the matrix, $V_\phi$ is a volume of the fluid inside the sample, and $V_{sur}$ is a volume of the fluid surrounding the sample. The method also includes separately determining volume of the fluid inside the sample, $V_\phi$, and volume of the fluid surrounding the sample, $V_{sur}$, using nuclear magnetic resonance (NMR), at step 104. The method may further include placing the sample in a predetermined volume of a weighing fluid at step 106, and measuring the mass of the fluid-saturated sample in the weighing fluid, at step 108. The mass of the sample in the weighing fluid, $m_f$, may be given by the formula $$m_f = V_m \rho_m + V_\phi \rho_l - V_c \rho_f$$

where $\rho_f$ is the density of the weighing fluid. At step 110, the method may further include determining a volume of the sample, $V_c$, using the formula $$V_c = (m_s - m_f - V_{sur} \rho_l) / \rho_f$$

The method may also include determining a bulk density of the sample, $\rho_b$, using the formula $$\rho_b = \frac{V_m \rho_m + V_\phi \rho_l}{m_s - m_f - V_{sur} \rho_f} \rho_f.$$

At step 112, the method may further include determining the volume of the matrix, $V_m$, using the formula $$V_m = (m_s - m_f - V_{sur} \rho_f) / \rho_f - V_\phi.$$

Finally, at step 114, the method may include determining the matrix or grain density of the subsurface formation, $\rho_m$, using the formula $$\rho_m = \frac{m_s - (V_\phi + V_{sur}) \rho_f}{(m_s - m_f - V_{sur} \rho_f) / \rho_f - V_\phi}.$$

Computer Readable Medium

Figure 16:
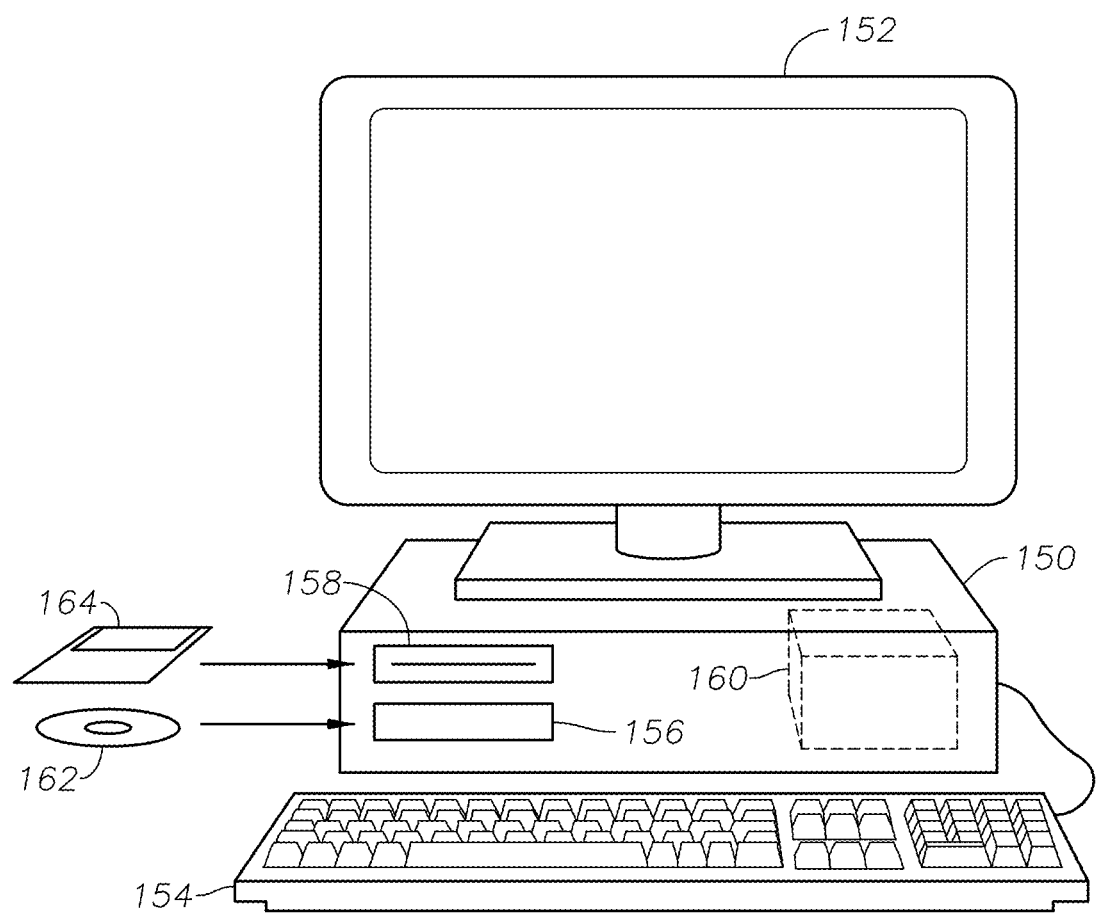
FIG. 16 is an example computer set up for determining matrix or grain density of a subsurface formation, according to some example embodiments of the disclosure.

Another example embodiment relates to computer programs stored in computer readable media. Referring to FIG. 16, the foregoing process as explained with reference to FIGS. 6-15 can be embodied in computer-readable code. The code can be stored on, for example, a non-transitory computer readable medium, such as a floppy disk 164, CD-ROM 162, which may be read by disk drives 156, 158, or a magnetic (or other type) hard drive 160 forming part of a general purpose programmable computer. The computer, as known in the art, includes a central processing unit 150, a user input device such as a keyboard 154, and a user display 152 such as a flat panel LCD display or cathode ray tube display. According to this embodiment, the computer readable medium 160, 162, 164 includes logic operable to trigger the computer to execute acts as set forth above and explained with respect to the previous figures. The non-transitory computer-readable medium 160, 162, 164 may have, for example, computer executable instructions that trigger the computer to perform the operations of receiving in-air mass of a fluid-saturated sample of the subsurface formation. The in-air mass includes mass of the sample, mass of a fluid surrounding the sample, and mass of the fluid inside the sample. The in-air mass of the fluid-saturated sample, $m_s$, may be given by the formula $$m_s = V_m \rho_m + (V_\phi + V_{sur}) \rho_l$$

where $\rho_m$ is a density of the matrix of the subsurface formation, $\rho_l$ is a density of the fluid inside and surrounding the sample, $V_m$ is a volume of the matrix, $V_\phi$ is a volume of the fluid inside the sample, and $V_{sur}$ is a volume of the fluid surrounding the sample. The computer executable instructions may also trigger the computer to determine volume of the fluid inside the sample, $V_\phi$, and volume of the fluid surrounding the sample, $V_{sur}$, using nuclear magnetic resonance (NMR). The computer executable instructions may also trigger the computer to receive mass of the fluid-saturated sample in a weighing fluid. The mass of the sample in the weighing fluid, $m_f$, may be given by the formula $$m_f = V_m \rho_m + V_\phi \rho_l - V_c \rho_f$$

where $\rho_f$ is the density of the weighing fluid. The computer executable instructions may also trigger the computer to determine a volume of the sample, $V_c$, using the formula $$V_c = (m_s - m_f - V_{sur} \rho_l) / \rho_f.$$

The computer executable instructions may further trigger the computer to determine a bulk density of the sample, $\rho_b$, using the formula $$\rho_b = \frac{V_m \rho_m + V_\phi \rho_l}{m_s - m_f - V_{sur} \rho_f} \rho_f.$$

The computer executable instructions may further trigger the computer to determine the volume of the matrix, $V_m$, using the formula $$V_m = (m_s - m_f - V_{sur} \rho_f) / \rho_f - V_\phi.$$

The computer executable instructions may further trigger the computer to determine the matrix or grain density of the subsurface formation, $\rho_m$, using the formula $$\rho_m = \frac{m_s - (V_\phi + V_{sur}) \rho_f}{(m_s - m_f - V_{sur} \rho_f) / \rho_f - V_\phi}.$$

Example System

Figure 17:
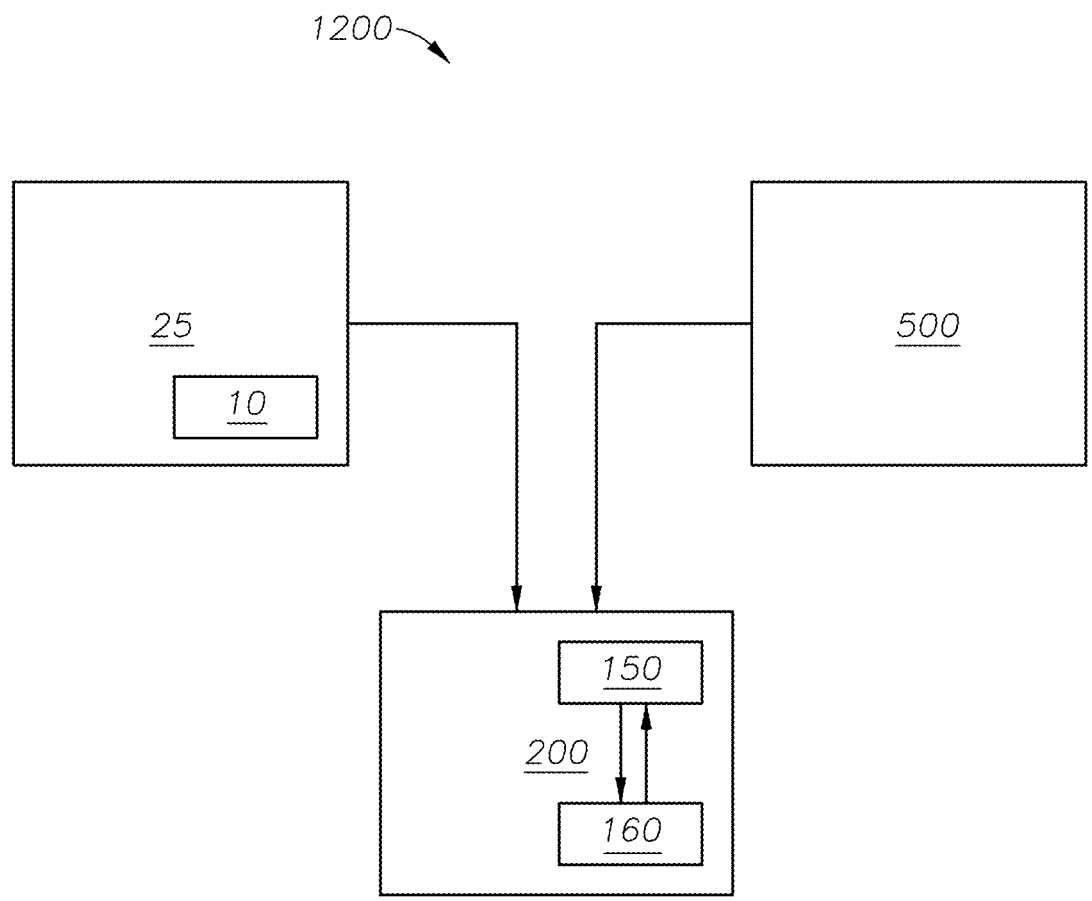
FIG. 17 is an example system for determining matrix or grain density of a subsurface formation, according to some example embodiments of the disclosure.

FIG. 17 illustrates system 1200 for determining matrix or grain density of a subsurface formation. The system 1200 may include a fluid-saturated sample 10 of the subsurface formation, as illustrated in FIGS. 6, 7, and 14. The system 1200 may also include a weighing scale 25, as illustrated in FIGS. 7 and 14, which may be configured to receive the fluid-saturated sample 10 and output the in-air mass and in-fluid mass of the sample 10. The system 1200 may also include a computer 200 having one or more processors 150 and a non-transitory computer readable medium 160, which may include computer executable instructions that when executed by the one or more processors 150, trigger the computer 200 to receive in-air mass of the fluid-saturated sample 10 of the subsurface formation from the weighing scale 25. The in-air mass may include mass of the sample, mass of a fluid surrounding the sample, and mass of the fluid inside the sample. The in-air mass of the fluid-saturated sample, $m_s$, may be given by the formula $$m_s = V_m \rho_m + (V_\phi + V_{sur}) \rho_l$$

where $\rho_m$ is a density of the matrix of the subsurface formation, $\rho_l$ is a density of the fluid inside and surrounding the sample, $V_m$ is a volume of the matrix, $V_\phi$ is a volume of the fluid inside the sample, and $V_{sur}$ is a volume of the fluid surrounding the sample. The system 1200 may also include a NMR device 500, which may be operably connected to computer 200 and configured to determine the volume of the fluid inside the sample, $V_\phi$, and volume of the fluid surrounding the sample, $V_{sur}$, using nuclear magnetic resonance (NMR). The computer 200 may be configured to receive the volume of the fluid inside the sample, $V_\phi$, and volume of the fluid surrounding the sample, $V_{sur}$, from the NMR device 500, and the mass of the fluid-saturated sample in a weighing fluid from the weighing scale 25. The mass of the sample in the weighing fluid, $m_f$, may be given by the formula $$m_f = V_m \rho_m + V_\phi \rho_l - V_c \rho_f$$

where $\rho_f$ is the density of the weighing fluid. The computer executable instructions may also trigger the computer to determine a volume of the sample, $V_c$, using the formula $$V_c = (m_s - m_f - V_{sur} \rho_l)/\rho_f$$

The computer executable instructions may further trigger the computer to determine a bulk density of the sample, $\rho_b$, using the formula $$\rho_b = \frac{V_m \rho_m + V_\phi \rho_l}{m_s - m_f - V_{sur} \rho_f} \rho_f.$$

The computer executable instructions may further trigger the computer to determine the volume of the matrix, $V_m$, using the formula $$V_m = (m_s - m_f - V_{sur} \rho_f)/\rho_f - V_\phi.$$

The computer executable instructions may further trigger the computer to determine the matrix or grain density of the subsurface formation, $\rho_m$, using the formula $$\rho_m = \frac{m_s - (V_\phi + V_{sur}) \rho_f}{(m_s - m_f - V_{sur} \rho_f)/\rho_f - V_\phi}.$$

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described as performing the recited function and not only structural equivalents, but also equivalent structures.

The invention claimed is:

1. A method for cleaning drill cuttings, the method comprising:
   collecting surfaced drill cutting samples from a shale shaker or a wellhead;
   filtering the surfaced drill cutting samples through a sieve having a first mesh size to remove cavings from the surfaced drill cuttings so that drill cuttings are obtained from the surfaced drill cuttings;
   placing the drill cuttings in a plurality of cylindrically shaped sieve baskets that are each disposed in one of a plurality of cylindrically shaped vessels;
   filling the vessels with brine if water-based-mud was used in drilling the drill cutting samples;
   filling the vessel with diesel if oil-based mud was used in drilling the drill cutting samples; and
   removing contaminants from the drill cuttings by sonicating the sieve baskets with ultrasonic waves from a sonicator while simultaneously mechanically shaking the sieve baskets with a mechanical means.

2. The method of claim 1, further comprising:
   wherein each sieve has a first mesh size, wherein each sieve basket has a second mesh size, and wherein the second mesh size is smaller than the first mesh size.

3. The method of claim 2, further comprising:
   moving the sieve basket to another vessel and repeating the steps of filling, mechanically shaking, and sonicating.

4. The method of claim 1, further comprising:
   replacing the brine in the vessel with clean brine if water-based-mud was used in drilling the drill cutting samples,
   replacing the diesel in the vessel with clean diesel oil-based mud was used in drilling the drill cutting samples; and
   repeating sonicating and shaking the vessel to separate the drill cuttings from contaminants thereon.

5. The method of claim 1, further comprising:
   separating the drill cuttings from the brine and conducting nuclear magnetic resonance ("NMR") imaging of drill cuttings that are saturated with the brine when water-based-mud was used in drilling the drill cutting samples; and
   separating the drill cuttings from the diesel and conducting nuclear magnetic resonance ("NMR") imaging of drill cuttings that are saturated with the diesel when oil-based-mud was used in drilling the drill cutting sample.

6. The method of claim 5, wherein the drill cuttings are obtained from a formation being penetrated by the drilling operation, the method further comprising characterizing the formation based on the NMR imaging of the drill cuttings.

7. The method of claim 6, wherein characterizing the formation comprises determining a matrix or grain density of the formation.

8. A system for cleaning drill cuttings, the system comprising:
   a sonicator-shaker comprising an ultrasonic bath sonicator and motor that simultaneously shakes and sonicates a sample;

a plurality of vessels in the sonicator shaker, the vessels being separate from one another and having a generally cylindrically shaped outer surface and selectively containing brine if water-based-mud was used in drilling the drill cutting samples or diesel if oil-based-mud was used in drilling the drill cutting samples, the sonicator shaker configured to simultaneously sonicate and shake the vessel to separate contaminants from the drill cuttings; and sieve baskets in each of the vessels that selectively contains drill cuttings.

9. The system of claim 8, wherein the sieve baskets each comprises:

mesh configured into a tubular that define sidewalls of each sieve basket and mesh spanning between the sidewalls a distance offset from an axial end of the sidewalls to define a bottom.

10. The system of claim 9, wherein the mesh structure and the mesh base have a mesh size of 0.5 mm.

11. The system of claim 8, further comprising a nuclear magnetic resonance imager for imaging the drill cuttings saturated with brine if water-based mud was used in drilling the drill cutting samples or diesel if oil-based mud was used in drilling the drill cutting samples and a processor for characterizing a formation from where the drill cuttings were obtained.

* * * * *

UNITED STATES PATENT AND TRADEMARK OFFICE
CERTIFICATE OF CORRECTION

PATENT NO. : 11,788,939 B2  
APPLICATION NO. : 16/655364  
DATED : October 17, 2023  
INVENTOR(S) : Althaus et al.

Page 1 of 1

It is certified that error appears in the above-identified patent and that said Letters Patent is hereby corrected as shown below:

In the Claims

Column 12, Claim 4, Line 4:
"samples,"
Should be changed to:
"samples;"

Column 12, Claim 4, Lines 5-6:
"diesel oil-based"
Should be changed to:
"diesel if oil-based"

Column 12, Claim 5, Line 11:
"sample."
Should be changed to:
"samples."

Column 13, Claim 9, Line 2:
"comprises:"
Should be changed to:
"comprise:"

Signed and Sealed this  
Twenty-first Day of November, 2023

Katherine Kelly Vidal  
*Director of the United States Patent and Trademark Office*